United States Patent [19]
Kitamura et al.

[11] Patent Number: 5,676,966
[45] Date of Patent: Oct. 14, 1997

[54] FEED ADDITIVE COMPOSITION FOR RUMINANTS

[75] Inventors: Nobuyoshi Kitamura; Susumu Shibahara; Toru Ikeda, all of Kawasaki, Japan

[73] Assignee: Ajinomoto Co., Inc., Tokyo, Japan

[21] Appl. No.: 424,639

[22] Filed: Apr. 19, 1995

[30] Foreign Application Priority Data

Apr. 20, 1994 [JP] Japan ...................................... 6-081500

[51] Int. Cl.$^6$ .............................. A61K 9/16; A23K 1/18
[52] U.S. Cl. ........................ 424/438; 424/442; 424/498; 426/99; 426/807; 514/951; 514/770
[58] Field of Search ................................. 424/442, 438, 424/490, 498; 426/99, 807

[56] References Cited

U.S. PATENT DOCUMENTS

| | | | |
|---|---|---|---|
| 4,948,589 | 8/1990 | Iijima et al. | 424/438 |
| 4,996,067 | 2/1991 | Kobayashi et al. | 426/96 |
| 5,227,166 | 7/1993 | Ueda et al. | 424/438 |
| 5,300,297 | 4/1994 | Ueda et al. | 424/438 |
| 5,405,628 | 4/1995 | Ueda et al. | 426/99 |
| 5,429,832 | 7/1995 | Ueda et al. | 426/96 |

*Primary Examiner*—Thurman K. Page
*Assistant Examiner*—James M. Spear
*Attorney, Agent, or Firm*—Oblon, Spivak, McClelland, Maier & Neustadt, P.C.

[57] ABSTRACT

A granular additive composition for ruminant feed which stably protects a biologically active substance in the rumen of the ruminant and allows it to be effectively digested and absorbed in the digestive organs after the abomasum.

4 Claims, No Drawings

FEED ADDITIVE COMPOSITION FOR RUMINANTS

BACKGROUND OF THE INVENTION

1. Field of the Invention

The present invention relates to an additive composition for ruminant feed. More particularly, the present invention relates to an additive composition for ruminant feed which enables digestion and absorption of a biologically active substance in the ruminant's digestive organs after the abomasum by coating the biologically active substance with a coating composition which is stable in the rumen of the ruminant and which releases the biologically active substance in the digestive organs after the abomasum.

2. Discussion of the Background

SUMMARY OF THE INVENTION

When biologically active substances such as amino acids, vitamins, and the like are orally administered directly to ruminants such as cattle, sheep, and the like, they are degraded by microorganisms in the rumen and, therefore, cannot be effectively utilized. Accordingly, rumen-bypass preparations for the ruminant, which protect biologically active substances from degradation by microorganisms in the rumen and allow the biologically active substance to be digested and absorbed in the digestive organs after the abomasum are important in the fields of ruminant feed, nutrient agents, animal drugs, and the like.

An additive composition for ruminant feed containing biologically active substance, coated with a fatty acid having 12 or more carbon atoms, a hardened animal/plant oil, and the like has already been proposed. Although granules coated with such oil and fat provide good protection in the rumen, it is difficult to obtain release of the biologically active substance in the digestive organs after the abomasum.

Accordingly, a method of adding a substance which promotes releasability as well as oil and fat to the substance to be protected, effecting dispersion of the biologically active substance, and carrying out granulation, and a method of coating the biologically active substance with a protecting substance have been proposed.

An example of the method of dispersing the biologically active substance in the protecting substance is found in unexamined published Japanese patent application 60-168351 which proposed a method of including 20% by weight or more of calcium carbonate and 10% by weight or more of an aliphatic monocarboxylic acid having 14 or more carbon atoms, hardened oil and fat, etc. together with the biologically active substance, and carrying out granulation. In addition, examined Japanese patent publication 59-10780 proposed a method of dispersing 30 to 50% by weight of a biologically active substance in a protecting substance composed of 10 to 35% by weight of a salt of an aliphatic monocarboxylic acid having 14 to 22 carbon atoms or a salt of ricinoleic acid and a residual part of an aliphatic monocarboxylic acid having 14 to 22 carbon atoms, ricinoleic acid, hardened oil and fat, etc.

An example of the method of coating the biologically active substance with a protecting substance is unexamined published Japanese patent application 63-317053 in which a method of coating a biologically active substance with a protecting agent composed of an aliphatic monocarboxylic acid having 12 to 24 carbon atoms, hardened oil and fat, and a glycerol fatty acid ester was proposed.

However, and in view of the importance of the protecting property, the method of dispersing a biologically active substance in a protecting substance requires one to considerably lower the inclusion ratio of the biologically active substance, since the biologically active substance exists near the surface of the granule. Thus, taking into consideration that the residence period in the rumen is from several (10) hours to several days, it is difficult to sufficiently protect water-soluble biologically active substances. On the other hand, when coated with a protecting substance composed of lecithin, glycerol fatty acid ester, and oil and fat, the strength of the coating layer is insufficient and there is a problem in the protecting property. Although the lecithin and glycerol fatty acid ester are used with the expectation of utilizing the emulsifying function of oil and fat, the releasability is not sufficient taking into consideration the time required to pass through the digestive organs after the abomasum.

Finally, a method of coating using a pH-responding synthetic polymer to utilize the difference of pH between the rumen and the abomasum has also been proposed. However, such a method is not satisfactory in view of the organic solvent used for coating, the expensive coating agent, and the like. As described above, for oral administration to the ruminant, it is important to design the preparation so as to prevent release of the biologically active substance in the rumen and release the biologically active substance in the digestive organs after the abomasum.

OBJECT OF THE INVENTION

One object of the present invention is to stably protect a biologically active substance in the rumen of the ruminant and allow it to be effectively digested and absorbed in the digestive organs after the abomasum with considerations of safety and economics in mind.

DETAILED DESCRIPTION OF THE INVENTION

The inventors of the present invention have discovered that excellent protecting properties in the rumen of a ruminant and extremely good releasability in the digestive organs after the abomasum can be simultaneously achieved by feed or feed additive granules obtained by coating a core comprising a biologically active substance with a coating composition comprising a protecting substance selected from hardened plant oil and fat, hardened animal oil and fat, etc.; an appropriate amount of a surface active agent selected from the group consisting of lecithin and a higher unsaturated fatty acid; and a talc powder. The present invention was completed based on this finding.

Thus, the present invention relates to a preferably granular additive composition for ruminant feed, which comprises a core comprising a biologically active substance and a coating composition coated thereon, said coating composition comprising 65 to 90% by weight of (A), 2 to 10% by weight of the following (B), and 8 to 30% by weight of (C) wherein:

(A) is at least one hydrophobic protecting substance selected from the group consisting of hardened animal or plant oil or fat, animal or plant fat, and a fatty acid ester, (B) is a surface active agent compatible with said hydrophobic protecting substance (A), and (C) is talc powder.

The weight ranges of A, B and C above include all values and all ranges therebetween.

The invention biologically active substance includes all known various nutrients, feeds containing the same, and drugs, such as amino acids, derivatives thereof, hydroxy homologues of amino acids, proteins, carbohydrates, fats, vitamins, and animal drugs, alone or as a mixture of two or more.

Illustrative examples of the invention biologically active substances include amino acids such as lysine, methionine, tryptophane, threonine, etc.; amino acid derivatives such as N-acylamino acids, N-hydroxymethylmethionine calcium salt, lysine hydrochloride, etc.; hydroxy homologues of amino acids such as 2-hydroxy-4-methylmercaptobutyric acid and salts thereof, etc.; natural nutrient powders such as cereal powder, plumage powder, fish powder, etc.; proteins such as casein, corn protein, potato protein, etc.; carbohydrates such as starch, sucrose, glucose, etc.; vitamins and substances having the function similar to vitamins such as vitamin A, vitamin A acetate, vitamin A palmitate, vitamin B family, thiamine, thiamine hydrochloride, riboflavin, nicotinic acid, nicotinamide, calcium pantothenate, choline pantothenate, pyridoxine hydrochloride, choline chloride, cyanocobalamin, biotin, folic acid, p-aminobenzoic acid, vitamin D2, vitamin D3, vitamin E, etc.; antibiotics such as tetracycline antibiotics, aminoglycoside antibiotics, macrolide antibiotics, polyether antibiotics, etc.; insecticides such as neguvon etc.; vermifuges such as piperazine etc.; hormones such as estrogen, stilbestrol, hexestrol, thyroprotein, goitrogen, growth hormone, etc.; and enzymes such as amylase, protease, xylanase, pectinase, cellulose, lactase, lipase, etc.

The method for preparation of the invention core containing a biologically active substance is not particularly limited, and the core may be prepared in granular form, preferably, in a nearly spherical granular form by any usual granulation method, fluidized bed granulation, agitation granulation, or the like and, if desired, may be mixed together with a viscosity increasing agent, a vehicle, etc.

As the viscosity-increasing agent, cellulose derivatives such as hydroxypropylcellulose, methylcellulose, carboxymethylcellulose sodium, etc., vinyl derivatives such as polyvinylalcohol, polyvinylpyrrolidone, etc., gum arabic, guar gum, sodium polyacrylate, xanthan gum, and the like may be used. As the vehicle, starch, proteins, crystalline cellulose, and the like may be used. If necessary, the specific gravity may be controlled by adding calcium carbonate, calcium phosphate, talc, and the like as the specific gravity-controlling agent.

As the invention hydrophobic protecting substance which coats the core containing the above-described biologically active substance, at least one substance selected from the group consisting of hardened animal and plant oils and fats, animal and plant oils and fats, and fatty acid esters. Mixtures may be used.

The hardened animal and plant oils and fats include hardened palm oil, hardened palm kernel oil, hardened soybean oil, hardened grapeseed oil, hardened castor bean oil, hardened beef tallow, hardened pork tallow, etc. As the animal and plant fat, haze wax, palm fat, beef tallow, sheep tallow, pork tallow, and the like may be used. As the fatty acid ester, esters of straight or branched $C_3$–$C_{30}$ fatty acids and straight or branched $C_1$–$C_{10}$ alcohol, and the like may be used. Examples of such esters are myristyl stearate, lauryl myristate, myristyl palmitate, behenyl octate, carnauba wax and bees wax.

The invention surface active agent used with the invention hydrophobic protecting substance may be any amphiphilic substance as long as it is compatible with the hydrophobic protecting substance which coats the core. Mixtures of surface active agents may be used. The term "compatible" means that the substance forms a homogenous solution with the hydrophobic protecting substance at temperatures higher than the melting point of the hydrophobic protecting substance and forms a homogenous solid mixture with the solidified hydrophobic protecting substance at temperatures lower than the melting point of the hydrophobic protecting substance.

Surface active agents which may be used in the present invention include, lecithins, higher ($C_6$–$C_{30}$) fatty acids, and oil-soluble non-ionic surface active agents. As the lecithin, soybean lecithin and other lecithins of plant origin, and egg yolk lecithin may be used. As the higher fatty acid, straight or branched saturated or unsaturated fatty acids having 8 or more carbon atoms are preferred. Examples of such fatty acids are behenic, stearic, oleic, palmitic, myristic, lauric, n-caproic and n-caprylic acids. More preferably, higher unsaturated fatty acids such as oleic acid, linoleic acid, palmitleic acid, and the like may be used. As the oil-soluble non-ionic surface active agent, fatty acid diglycerides, and the like are exemplified.

The surface active agent used in the present invention affects the rumen protecting property and releasability in the digestive organs after the abomasum of the invention feed additive composition. That is, if its compounding ratio in the coating composition is low, the protecting property is good but the releasability in the digestive organs after the abomasum is poor. If its compounding ratio is high, the releasability in the digestive organs after the abomasum is improved but the protecting property in the rumen tends to decrease. In addition, if the compounding ratio is too high, the stability of the coating composition to high temperature decreases, and unfavorable properties such as the mutual adhesion of granules at high temperature, a decrease of the protecting property in the rumen, and the like occur.

When used with the above-described surface active agent, the talc used in the present invention improves releasability in the digestive organs after the abomasum without affecting the protecting property obtained in the rumen and helps to prevent any decrease in stability to high temperatures which may occur when a larger amount of surface active agent is used.

As the talc powder used in the present invention, a coarse powder is not preferable. That is, if the mean granular diameter is 50 µm or more, the talc powder is sedimented when the coating composition is melted and thus it is difficult to obtain homogenous coating. In addition, when a thin coating polymer is formed, problems occur in many cases, such as removal of the talc powder from the coating layer, and the like. In the present invention, talc powder having a mean granular diameter of 40 µm or less is preferably used and that having a mean granular diameter of 30 µm or less is more preferably used. Mixtures of talcs having different diameters may be used.

With respect to the compounding ratios of the hydrophobic protecting substance, the surface active agent and the talc powder in the coating composition according to the present invention, 90 to 65 parts by weight of the hydrophobic protecting substance based on 100 parts by weight of the coating composition, 8 to 30 parts by weight of the surface active agent based on 100 parts by weight of the coating composition, and 8 to 30 parts by weight of the talc powder based on 100 parts by weight of the coating composition are preferable. More preferably, 10 to 20 parts by weight of the talc powder based on 100 parts by weight of the coating composition is used. However, all values and all ranges between all the above-listed parts by weight are included.

According to the present invention, it is possible to obtain the coating composition by merely mixing the hydrophobic protecting substance, the surface active agent, and the talc powder together. However, a more preferable coating composition may be obtained by treating the surface of the talc powder with the surface active agent in advance so as to improve the dispersion of the talc powder in the coating composition. The method for surface treatment is not particularly limited and examples of the method include a method in which the talc powder and the surface active agent are kneaded in advance and then mixed with the hydrophobic protecting substance; and a method in which the surface active agent is dispersed or dissolved in water or in a organic solvent, the talc powder is added, and then water or the organic solvent is removed.

If necessary, substances such as an emulsifier, an emulsion stabilizer, inorganic salts, and the like may be added in the coating composition. As the emulsifier, metal salts of fatty acid, glycerol monofatty acid esters, sorbitan fatty acid esters, propylene glycol fatty acid esters, sucrose fatty acid esters, cholic acid derivatives, and the like may be used. As the emulsion stabilizer, gum arabic, alginic acid, propylene glycol alginate, weran gum, cardran, gaty gum,, karaya gum, xanthan gum, chitin, chitosan, sodium chondroitin sulfate, guar gum, jeran gum, tamarind gum, tara gum, tragacanth gum, furcellaran, pullulan, pectin, locust bean gum, and the like may be used. As the inorganic salt, calcium hydrogenphosphate, calcium carbonate, sodium carbonate, sodium hydrogencarbonate, calcium sulfate, and the like may be used. In addition, wax and the like may be added.

The granular additive composition for ruminant feed according to the present invention is characterized in that the core containing the above-described biologically active substance is coated with the above-described coating composition. It is preferable that the coating amount of the coating composition is as low as possible since the inclusion ratio of the biologically active substance becomes high. However, the amount of the coating composition should be such an amount as to sufficiently protect the biologically active substance in the rumen. In general, 100 parts by weight of the core containing the biologically active substance is coated with preferably 10 to 100 parts by weight of the coating composition, more preferably with 20 to 50 parts by weight of the coating composition but including all values and ranges therebetween. The thickness of the coating layer is generally in the range of from 50 μm to 200 μm.

The method for coating is not particularly limited and coating can be carried out by any coating method such as fluidized bed coating, pan coating, melt coating, agitation coating, spray coating, and the like.

The shape of the granular additive composition for ruminant feed according to the present invention is not particularly limited but those having a diameter of 5 mm or less are preferably used in order to reduce the destruction of the granules due to the rumination of the animal. More preferably, those having a mean granular diameter of 3 mm or less are used. In addition, those having a granular diameter of 1 mm or more are preferably used in order to provide a good ratio of the core to the whole composition. Granules having a specific gravity of 1.0 to 1.5 are preferably used and those having a specific gravity of 1.1 to 1.4 are particularly preferable since the residence period in the rumen of the ruminant is shorter.

The present invention is will now be illustrated in detail by way of Examples and Comparative Examples, but the scope of the present invention is not limited to these Examples.

EXAMPLES

The released amount of amino acid used in the Examples as a biologically active substance was assayed by the liquid chromatography.

Protecting Property in the Rumen

A sample (about 1 kg) is placed in a 300 ml Erlenmeyer flask, 200 ml of Mc Dougall buffer corresponding to the rumen juice was poured in the flask, and the flask was shaken at 39° C. for 24 hours. After completion of the shaking, the released amount of the biologically active substance was assayed and the protecting property in the rumen was calculated.

| *McDougall buffer: | A buffer which is obtained by dissolving the following reagents in 1000 ml of water |
|---|---|
| Sodium Hydrogencarbonate: | 7.43 g |
| Sodium Secondary Phosphate-12H20 | 7.00 g |
| Sodium chloride: | 0.34 g |
| Potassium Chloride: | 0.43 g |
| Magnesium Chloride-6H20 | 0.10 g |
| Calcium Chloride: | 0.05 g |

Releasability in the Abomasum

After the test of the protecting property, the sample shaken was recovered and placed in a 300 ml Erlenmeyer flask. Then, 200 ml of the Clark-Lubs buffer corresponding to the abomasum juice was poured in the flask, and the flask was shaken at 390° C. for 1 hour. After completion of the shaking, the released amount of the biologically active substance was assayed and the releasability in the rumen was calculated.

| Clark-Lubs buffer: | A buffer which is obtained by dissolving the following reagents in 1000 ml of water |
|---|---|
| Potassium Chloride: | 3.73 g |
| Hydrochloric Acid: | 2.1 ml |

Releasability in the Small Intestine

After the test of the releasability in the abomasum, the sample shaken was recovered and placed in a 300 ml Erlenmeyer flask. Then, 200 ml of buffer corresponding to small intestine juice was poured in the flask, and the flask was shaken at 390° C. for 7 hour. After completion of the shaking, the released amount of the biologically active substance was assayed and the releasability in the small intestine was calculated.

The sum of the above-described release ratios in the abomasum-corresponding liquid and the release ratio in the small intestine-corresponding liquid is taken as the release ratio in the digestive organs after the abomasum (hereinafter, referred to as the "digestive organ corresponding released ratio").

Example 1

Using a kneader, 325 g of L-lysine hydrochloride, 172.5 g of talc (mean granular diameter of 20 μm or less, the same applies to the following Examples and Comparative Examples unless otherwise indicated), 2.5 g of carboxymethylcellulose sodium, and 135 g of water were kneaded, and then made into cylindrical granules by using an extrusion granulator having a screen with opened 1.5 mmø meshes. The granules obtained were shaped to nearly spherical form by using a rounding machine (Marumerizer, manufactured by Fuji Paudal Co., Ltd.). The spherical granules obtained were dried by fluidized bed drying to obtain a L-lysine hydrochloride-containing core having a grain size distribution of the granular diameter of 1 mm to 2.5 mm.

A protecting substance containing 5 parts by weight of soybean lecithin, 10 parts by weight of a talc powder and 85 parts by weight of hardened beef tallow was melted, and the melted protecting substance in a proportion of 43 parts by weight was coated on 100 parts by weight of the core sieved with a sieve so as to have a mean granular diameter of 1.5 mm. The coated granules were subjected to the above-described evaluation test. As a result, the rumen released ratio was 3% and the digestive organ-corresponding released ratio was 78%.

Example 2

A mixture obtained by previously kneading 3 parts by weight of oleic acid and 20 parts by weight of a talc powder having a mean granular diameter of 30 μm was added to 77 parts by weight of hardened beef tallow, and the resulting mixed and melted coating composition in a proportion of 39 parts by weight was coated on 100 parts by weight of the core prepared in the same manner as Example 1 and sieved with a sieve so as to have a mean granular diameter of 1.18 mm. The coated granules were subjected to the above-described evaluation test. As a result, the rumen released ratio was 5% and the digestive organ-corresponding released ratio was 82%.

Example 3

Three parts by weight of pork tallow, 5 parts by weight of soybean lecithin, 8 parts by weight of a talc powder having a mean granular diameter of 15 pm, and 2 parts by weight of calcium carbonate were added to 82 parts by weight of hardened beef tallow, and the resulting mixed and melted coating composition in a proportion of 43 parts by weight was coated on 100 parts by weight of the core prepared in the same manner as Example 1 and sieved with a sieve so as to have a mean granular diameter of 2.00 mm. The coated granules were subjected to the above-described evaluation test. As a result, the rumen released ratio was 4% and the digestive organ-corresponding released ratio was 83%.

Example 4

Three parts by weight of oleic acid, 10 parts by weight of a talc powder, 2 parts by weight of gum arabic were added to 85 parts by weight of hardened beef tallow, and the resulting mixed and melted coating composition in a proportion of 43 parts by weight was coated on 100 parts by weight of the core prepared in the same manner as Example 1 and sieved with a sieve so as to have a mean granular diameter of 2.36 mm. The coated granules were subjected to the above-described evaluation test. As a result, the rumen released ratio was 5% and the digestive organ-corresponding released ratio was 80%.

Example 5

A methionine-containing core was obtained in the same manner as Example 1 by using 325 g of methionine, 172.5 g of talc, 2.5 g of caroboxymethylcellulose sodium, and 100 g of water. Five parts by weight of lecithin and 15 parts by weight of a talc powder were added to 80 parts by weight of hardened beef tallow, and the resulting mixed and melted coating composition in a proportion of 43 parts by weight was coated on 100 parts by weight of the core prepared in the same manner as Example 1 and sieved with a sieve so as to have a mean granular diameter of 1.70 mm. The coated granules were subjected to the above-described evaluation test. As a result, the rumen released ratio was 3% and the digestive organ-corresponding released ratio was 81%.

Example 6

The coated granules obtained in Example 1 were sealed in a vessel, heated at 40° C. for 96 hours, and then subjected to the above-described evaluation test. As a result, the rumen released ratio was 7% and the digestive organ-corresponding released ratio was 79%.

Comparative Example 1

A protecting substance containing 20 parts by weight of a talc powder and 80 parts by weight of hardened beef tallow was melted, and the melted protecting substance in a proportion of 43 parts by weight was coated on 100 parts by weight of the core prepared in Example 1. The coated granules were subjected to the above-described evaluation test. As a result, the rumen released ratio was 1% and the digestive organ-corresponding release ratio was 1%.

Comparative Example 2

A coating composition obtained by adding and mixing 5 parts by weight of soybean lecithin to 95 parts by weight of hardened beef tallow was melted, and the melted coating composition in a proportion of 39 parts by weight was coated on 100 parts by weight of the core prepared in Example 2. The coated granules were subjected to the above-described evaluation test. As a result, the rumen released ratio was 8% and the digestive organ-corresponding released ratio was 21%.

Comparative Example 3

A coating composition obtained by adding and mixing 8 parts by weight of soybean lecithin to 92 parts by weight of hardened beef tallow was melted, and the melted coating composition in a proportion of 33 parts by weight was coated on 100 parts by weight of the core prepared in Example 1. The coated granules were subjected to the above-described evaluation test. As a result, the rumen released ratio was 25% and the digestive organ-corresponding released ratio was 35%.

Comparative Example 4

Three parts by weight of oleic acid and 20 parts by weight of a talc powder (mean granular diameter: 50μ) were added to 77 parts by weight of hardened beef tallow, and the resulting mixed and melted coating composition in a proportion of 39 parts by weight was coated on 100 parts by weight of the core prepared in the same manner as Example 1 and sieved with a sieve so as to have a mean granular diameter of 1.18 mm. The coated granules were subjected to the above-described evaluation test. As a result, the rumen released ratio was 55% and the digestive organ-corresponding released ratio was 42%.

Comparative Example 5

The coated granules obtained in Comparative Example 3 were sealed in a vessel, heated at 40° C. for 96 hours, and then subjected to the above-described evaluation test. As a result, the rumen released ratio was 67% and the digestive organ-corresponding released ratio was 27%.

The above-described results are summarized in Table 1 and Table 2. From Examples 1 to 5 and Comparative Examples 1 to 3, it is clear that excellent protecting property in the rumen and excellent releasability in the digestive organs after the abomasum are obtained and stability to high temperature is improved when a surface active agent compatible with the hydrophobic protecting substance and a talc powder are included in a coating composition.

As explained above, a granular additive composition for ruminant feed which has effects in its protecting property in the rumen and releasability in the digestive organs after the abomasum in comparison with the prior art is obtained by a preparing a granular composition which comprises a core comprising a biologically active substance and a coating composition comprising 90 to 65% by weight of at least one hydrophobic protecting substance selected from the group consisting of hardened animal and plant oils and fats, animal and plant fats, and fatty acid esters, 2 to 10% by weight of the surface active agent compatible with the hydrophobic protecting substance, and 8 to 30% by weight of a talc powder.

The present invention provides a feed additive by which the biologically active substance can be effectively absorbed by the ruminant. This application is based on Japanese Application 081500/1994 filed Apr. 20, 1994 incorporated herein by reference.

TABLE 1

| Example No. | 1 | 2 | 3 | 4 | 5 | 6 |
|---|---|---|---|---|---|---|
| Biologically Active Substance | Lysine hydro-chloride | Lysine hydro-chloride | Lysine hydro-chloride | Lysine hydro-chloride | Methionine | Lysine hydro-chloride |
| Mean Granular Diameter (mm) | 1.5 | 1.18 | 2.00 | 2.36 | 1.70 | 1.5 |
| Weight Part of Core | 100 | 100 | 100 | 100 | 100 | 100 |
| Weight Part of Coating Layer Composition (%) | 43 | 39 | 43 | 43 | 43 | 43 |
| Beef Tallow Hardened Oil | 85 | 77 | 82 | 85 | 80 | 85 |
| Pork Tallow | — | — | 3 | — | — | — |
| Lecithin | 5 | — | 5 | — | 5 | 5 |
| Oleic Acid | — | 3 | — | 3 | — | — |
| Talc Powder | 10 | 20 | 10 | 15 | 10 | — |
| Gum Arabic | — | — | — | 2 | — | — |
| Calcium Carbonate | — | — | 2 | — | — | — |
| High Temperature Treatment (40° C., 96 Hrs) | not carried out | not carried out | not carried out | not carried out | not carried out | carried out |
| Released Ratio (%) | | | | | | |
| Corresponding to Rumen | 3 | 5 | 4 | 5 | 3 | 7 |
| Corresponding to Digestive Organ (Abomasum and Small Intestine) | 78 | 82 | 83 | 80 | 81 | 79 |

TABLE 2

| Comparative Example No. | 1 | 2 | 3 | 4 | 5 |
|---|---|---|---|---|---|
| Biologically Active Substance | Lysine hydro-chloride | Lysine hydro-chloride | Lysine hydro-chloride | Lysine hydro-chloride | Lysine hydro-chloride |
| Mean Granular Diameter (mm) | 1.5 | 1.18 | 1.5 | 1.18 | 1.5 |
| Weight Part of Core | 100 | 100 | 100 | 100 | 100 |
| Weight Part of Coating Layer Composition (%) | 39 | 39 | 33 | 39 | 33 |
| Beef Tallow Hardened Oil | 80 | 95 | 92 | 77 | 92 |
| Lecithin | — | 5 | 8 | — | 8 |
| Oleic Acid | — | — | — | 3 | — |
| Talc Powder | 20 | — | — | 20 | — |
| High Temperature Treatment (40° C., 96 Hrs) | not carried out | not carried out | not carried out | not carried out | carried out |
| Released Ratio (%) | | | | | |
| Corresponding to Rumen | 1 | 8 | 25 | 55 | 67 |
| Corresponding to Digestive Organ (Abomasum and Small Intestine) | 1 | 21 | 35 | 42 | 27 |

What is claimed as new and desired to be secured by Letters Patent of the United States is:

1. A composition for ruminant feed, comprising a core and a coating composition coated thereon, said core comprising a biologically active substance, said coating composition comprising 65 to 90% by weight of (A), 2 to 10% by weight (B), and 8 to 30% by weight (C), wherein (A) is at least one hydrophobic protecting substance selected from the group consisting of hardened animal and plant oil and fat, animal and plant fat, and a fatty acid ester, (B) is a surface active agent compatible with said hydrophobic protecting substance (A), and (C) is talc powder, wherein said talc is in the form of a fine powder having a mean granular diameter of 40 μm or less.

2. The composition as claimed in claim 1, wherein said surface active agent compatible with the hydrophobic protecting substance is at least one member selected from the group consisting of lecithin and $C_6$–$C_{30}$ unsaturated fatty acids.

3. The composition as claimed in claim 1, wherein the surface of said talc powder is treated with said surface active agent compatible with the hydrophobic protecting substance (A).

4. The composition as claimed in claim 1, said composition being in granular form and having a mean granular diameter of from 1 to 3 mm and a specific gravity from 1.0 to 1.5.

* * * * *